April 13, 1948.   L. W. HUSSEY   2,439,389

PULSE GENERATOR

Filed Aug. 8, 1944

INVENTOR
L. W. HUSSEY
BY
George C. Lord
ATTORNEY

Patented Apr. 13, 1948

2,439,389

UNITED STATES PATENT OFFICE 2,439,389

PULSE GENERATOR

Luther W. Hussey, Madison, N. J., assignor to Bell Telephone Laboratories, Incorporated, New York, N. Y., a corporation of New York Application August 8, 1944, Serial No. 548,613

4 Claims. (Cl. 171—97)

This invention relates to pulse generators, particularly for keying or modulating ultra-high frequency radio transmitters for the transmission of recurrent, short pulses of high power.

Various systems, for example, distance measuring and object locating systems, employ high power recurrent pulses of ultra-high frequency radio waves. Such pulses may be of very short duration compared to the interval between pulses. Consequently the average power demand on the prime power source is quite low, even for high peak power outputs. On the other hand, the system must be capable of meeting the high instantaneous power demands during the pulse intervals.

An object of the invention is to provide an efficient and economical pulse generator.

One general type of pulse generating system that has been found useful in such applications is that of the copending application of William Shockley, Serial No. 460,328, filed October 1, 1942, Patent No. 2,416,718, of March 4, 1947. The principle of operation of the Shockley system is that of double energy storage, the energy from the prime source being first stored magnetically and then transferred to a capacitor from which it is discharged to the load circuit. This requires two discrete switching operations or their equivalent: one for the transfer of energy from the magnetic to the electric storage, and the other for the ultimate discharge to the load. In the above-mentioned Shockley patent, one of the circuits shown for accomplishing this second switching or energy transfer operation employs a non-linear inductor. In the operation of this circuit the sharp drop in the impedance of such an inductor as its magnetic core passes from the non-saturated to the saturated condition is utilized to achieve this switching function. In this type of circuit it is necessary to employ a blocking capacitor in order to block the flow of direct current during the non-active period of the operating cycle. As a result this blocking capacitor provides a source of stored energy that will discharge through the tube used for establishing an inductive charging circuit. If uncontrolled this action not only results in a considerable waste of energy, but also, if the capacitor discharge is permitted to carry the non-linear coil into the saturation region, may result in plate saturation of the tube and so limit the energy storage in the inductive system.

In the copending application of Manley and Peterson, Serial No. 502,282, filed September 14, 1943, now Patent Number 2,436,395, of February 24, 1948, it is brought out that the operation of such a pulse generating system is improved by the application to the non-linear inductor of a substantial polarizing magnetizing force and several circuits for producing the polarization are disclosed.

Another object of the present invention is to improve the method of applying such a polarizing bias to the non-linear inductor.

In accordance with a feature of the present invention, the polarizing effect is produced by a current circulating during the intervals between pulses due to the interchange of energy between the inductive portions of the circuit and the blocking capacitor included in series with the non-linear inductor. By properly proportioning the circuit elements, particularly with respect to the pulse recurrence rate, it has been found that the polarizing effect required for efficient operation can be obtained.

These and other objects, features and aspects of the invention can be more readily understood by reference to the following detailed description in connection with the drawing in which.

Figure 1:
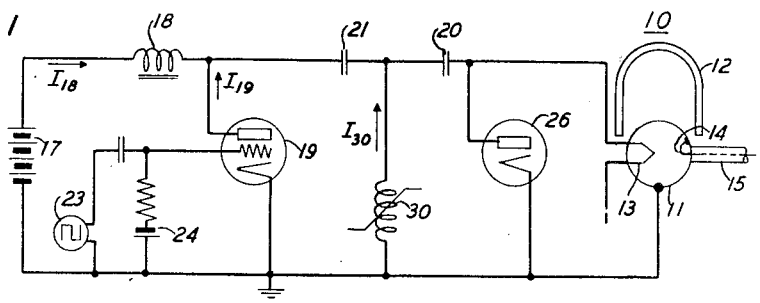
Fig. 1 is a schematic circuit diagram of one embodiment of the invention.

In the system of Fig. 1 the invention is employed for producing high power ultra-high frequency radio waves. For the purpose of illustration the ultra-high frequency generator is shown as a multicavity magnetron 10 of the type of United States Patent 2,063,342 to Samuel, December 8, 1936, for example. In this type of oscillator the anode 11 forms an external sheath or enclosure which it is desirable to maintain at ground potential. When the tube is subjected to a magnetic field supplied by the magnet 12 and a high direct current voltage is impressed between the anode 11 and the electron-emitting cathode 13, there are produced high power oscillations of a frequency determined by the internal structure of the device as described in more detail in the Samuel patent. These oscillations may be picked up by a loop 14 and transmitted through a coaxial line 15 to an antenna (not shown).

The remainder of the circuit of Fig. 1 constitutes the pulse generator circuit for producing high power direct current recurrent pulses of short duration which are impressed between the anode 11 and cathode 12 for causing the production of corresponding ultra-high frequency oscillations.

The prime source of power is shown as a battery 17, though in most practical applications it would be a rectifier, direct current generator or the like. The positive terminal of the battery 17 is connected through an inductor 18 to the anode of a vacuum tube 19, the cathode of which is connected to the grounded negative terminal of the battery 17. A storage capacitor 20 is connected to the anode of the tube 19 through a blocking capacitor 21 and to the cathode 13 of the magnetron 10.

The control grid of the tube 19 is normally biased to cut-off or beyond by the battery 24. The operation of the tube 19 is controlled by a positive square wave supplied from the source 23. A charging diode 26 is connected in parallel to the space path of the magnetron 10 to provide a conductive path in the direction opposite to that provided by the magnetron space path.

A non-linear inductor 30 is connected between the junction of the capacitors 20 and 21 and ground and effectively in parallel to the space path of the tube 19. The non-linear inductor 30 is provided with a core of magnetic material of such characteristics that the inductance is high for very low magnetizing forces, but is readily saturable so that at a higher though still relatively low magnetizing force the inductance drops to a very low value.

Figure 2:
Figs. 2 to 6 are graphs illustrating the operation of the invention.
Figure 3:
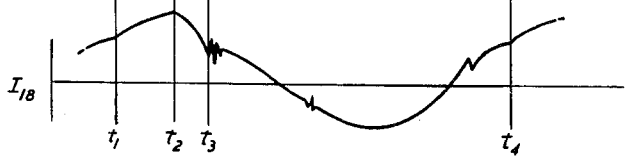
Figure 4:
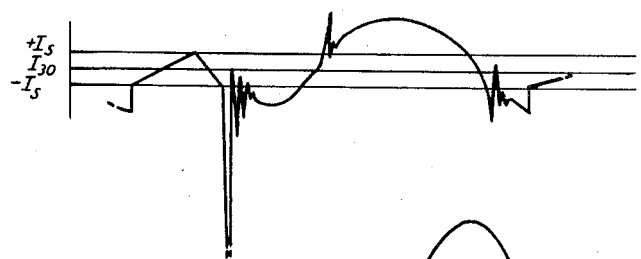
Figure 5:
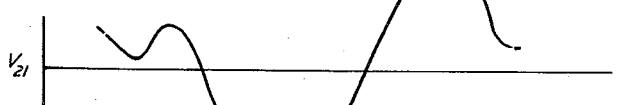
Figure 6:
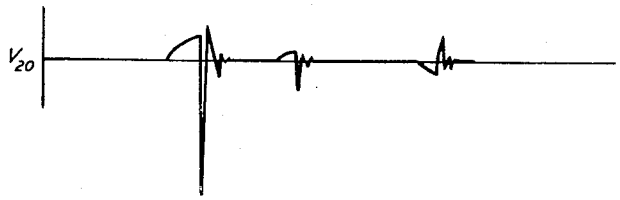

The operation of the circuit will be explained with reference to Figs. 2 to 6 which show various currents and voltages of the system plotted against time, namely, Fig. 2 the current $I_{19}$ through the tube 19, Fig. 3 the current $I_{18}$ through the inductor 18, Fig. 4 the current $I_{30}$ through the inductor 30, Fig. 5 the voltage $V_{21}$ across the capacitor 21, and Fig. 6 the voltage $V_{20}$ across the capacitor 20. The explanation is based on the assumption that the circuit has been in operation for several cycles, so that conditions for producing a repetitive cycle of operations have been set up.

Beginning at a time $t_1$ when the voltage from the source 23 has just driven the grid of the tube 19 positive causing it to conduct, there is thus provided a low impedance path for the current $I_{30}$ flowing through the non-linear inductor 30 which at that instant is well within the saturation region where the inductance is very small. As a result the current $I_{30}$ suddenly changes from its original value to the saturation value $-I_s$ and the current $I_{19}$ through the tube rises a corresponding amount. During the following period from $t_1$ to $t_2$ while the tube is conducting, the current $I_{18}$ rises slowly from its value at $t_1$ at a rate determined by the inductance of coil 18, the current being supplied by the battery 17, and the current $I_{30}$ changes from the value $-I_s$ to the value $+I_s$ carrying the inductor 30 through its unsaturated or inductive region, this current being supplied by the capacitor 21. The current for both of these inductive branches is carried by the tube 19.

At the instant $t_2$ the tube 19 is blocked by the termination of the positive portion of the wave from the source 23 but due to the inductive effects the currents in both conductors 18 and 30 will tend to continue the flow. As a result the current will be diverted to the capacitor 20 which will become charged. During this capacitor charging period from $t_2$ to $t_3$ the current $I_{18}$ decreases and the current $I_{30}$ actually reverses in direction carrying the inductor 30 through its unsaturated region back to the opposite saturation value $-I_s$. The circuit by which the current is supplied to the storage capacitor 20 is completed through the charging diode 26. When the current through the inductor 30 reaches the saturation value $-I_s$ its inductance suddenly drops to a very small value, and a low impedance path is provided therethrough. At this instant $t_3$ the capacitor 20 discharges through this low impedance path to the magnetron oscillator. This provides a high energy pulse to the magnetron, represented by the high current and high voltage impulses of $I_{30}$ and $V_{20}$ occurring at that instant. Following this there are minor oscillations which die out rapidly and which may be controlled by known design techniques so as not to reach values that will affect the magnetron.

In the subsequent period from $t_3$ to $t_4$ while the tube 19 is maintained at cut-off, an oscillatory current is set up through the capacitor 21 and inductors 18 and 30 in series. As may be determined from a consideration of the curves of Figs. 3, 4 and 5, this action results in a complete cycle of more or less sinusoidal oscillation during the period $t_3$ to $t_4$. This brings the current $I_{30}$ to the same point well in the saturation region of the inductor 30 at which it was at the beginning of the active cycle at $t_1$ and the voltage on the capacitor 21 is at a relatively low value. This result is achieved by the proper choice of the value of the capacitor 21 with respect to the characteristics of the inductors 18 and 30 and to the length of the period $t_3$ to $t_4$ which is a function of the pulse recurrence rate.

At certain points in the period of this oscillatory action small secondary oscillations are set up, as will be observed on the graphs. These take place as the current $I_{30}$ in increasing goes through the saturation point, i. e., as the inductor 30 is driven into saturation. This effect is in general incidental to the operation of the circuit for the purpose of this invention, but will be briefly described. During the main portion of the oscillation cycle the currents $I_{18}$ and $I_{30}$ are equal. However when the current $I_{30}$ decreases to the saturation value $I_s$ the inductance of the inductor 30 suddenly rises from a negligible to a very high value and current is diverted to the capacitor 20, causing it to charge, as may be observed on the graph of Fig. 6. Then as the current $I_{30}$ after reversing reaches the saturation point in the opposite sense, the inductance of inductor 30 suddenly drops to a negligible value and provides a low impedance path for the discharge of the capacitor 20. It is this discharge that causes these spurious oscillations. As shown on the graph of Fig. 6, the charge acquired by the capacitor 20 during these periods is comparatively small with the result that the voltage developed during the discharge is not sufficient to bring the oscillator 10 into operation.

While the capacitor 21 is shown as connected between the inductor 18 and the point from which the inductor 30 and capacitor 20 branch, it may be connected in the branch circuit in series with the inductor 30 with similar results.

What is claimed is:

1. In a recurrent impulse generator of the type in which energy from a direct current source is first stored magnetically by establishing a current in an inductive circuit and is then transferred to a capacitive system at a high voltage from which it is subsequently discharged impulsively, an inductive system including means for timing the impulsive discharge comprising a first inductor, a source of direct current in series therewith, a path in shunt to said first inductor and said source and including in series a second inductor having a readily saturable magnetic core and a timing capacitor, said timing capacitor being of such capacity as to form with said inductors a circuit effectively resonant at substantially the frequency of recurrence of the impulses.

2. A recurrent pulse generator comprising a load circuit, a source of direct current, a first inductor, a storage capacitor, a cyclically operated device for intermittently establishing a path for the flow of current from said source through said first inductor and interrupting said flow of current, circuit connections for charging said storage capacitor by the surge developed upon the interruption of said flow of current, a second inductor having a readily saturable magnetic core and so connected and proportioned that said core saturates at substantially the instant of maximum charge on said storage capacitor to provide a low impedance path for the discharge of said storage capacitor to said load circuit, and a blocking capacitor connected in series with said second inductor to prevent the flow of direct current from said source therethrough and having such a capacity as to provide with said first and second inductors a circuit effectively resonant at such a frequency that the current through said second inductor at each instant of establishment of said path is substantially greater than that required to saturate said core.

3. A recurrent impulse generator comprising a first inductor, a storage capacitor, a second inductor having a magnetic core with a high permeability at low magnetizing forces and readily saturable at higher magnetizing forces, a load circuit, circuit connections including recurrent, intermittently operated means for supplying current from said source to said first inductor and for interrupting said flow of currrent, circuit connections for charging said storage capacitor by the surge voltage developed upon said interruption of said flow of current, circuit connections for discharging said storage capacitor to the load circuit through said second inductor upon the saturation of said core, and a blocking capacitor connected in series with said second inductor to prevent the flow of direct current therethrough and forming a series circuit with both of said inductors and having such a capacity that the circulating current in said series circuit at each instant of establishment of said flow of current from said source will be of such magnitude as to magnetize said core to a value substantially greater than saturation and in the same direction as the flow of current during the discharge of said storage capacitor.

4. A recurrent impulse generator comprising a source of direct current, a first inductor, a storage capacitor, a second inductor having a readily saturable magnetic core, cyclically operated means for intermittently establishing a flow of current from said source through said first inductor and for interrupting said flow of current to charge said storage capacitor by the surge voltage developed upon said interruptions, a load circuit, connections for discharging said storage capacitor through said second inductor to said load circuit, and a blocking capacitor connected in circuit with said inductors and having such a capacity that the circulating current in said second inductor at instant of establishment of the current from said source through said first inductor is at least sufficiently large to saturate said core.

LUTHER W. HUSSEY.